US008707381B2

United States Patent
Polumbus et al.

(10) Patent No.: US 8,707,381 B2
(45) Date of Patent: Apr. 22, 2014

(54) CAPTION AND/OR METADATA SYNCHRONIZATION FOR REPLAY OF PREVIOUSLY OR SIMULTANEOUSLY RECORDED LIVE PROGRAMS

(75) Inventors: Richard T. Polumbus, Englewood, CO (US); Michael W. Homyack, Highlands Ranch, CO (US)

(73) Assignee: Caption Colorado L.L.C., Greenwood Village, CO (US)

( * ) Notice: Subject to any disclaimer, the term of this patent is extended or adjusted under 35 U.S.C. 154(b) by 310 days.

(21) Appl. No.: 12/886,769

(22) Filed: Sep. 21, 2010

(65) Prior Publication Data

US 2011/0069230 A1 Mar. 24, 2011

Related U.S. Application Data (60) Provisional application No. 61/244,823, filed on Sep. 22, 2009.

(51) Int. Cl.
*H04N 7/173* (2011.01)
*G10L 15/04* (2013.01)
*H04N 21/4402* (2011.01)
*G10L 15/22* (2006.01)
*G10L 15/26* (2006.01)

(52) U.S. Cl.
CPC ........ *H04N 21/440236* (2013.01); *G10L 15/22* (2013.01); *G10L 15/26* (2013.01)
USPC ............ 725/131; 704/251; 704/276; 715/203

(58) Field of Classification Search
USPC .................................. 725/131, 137
See application file for complete search history.

(56) References Cited

U.S. PATENT DOCUMENTS

| 4,570,232 | A | * | 2/1986 | Shikano | 704/241 |
|---|---|---|---|---|---|
| 5,598,557 | A | * | 1/1997 | Doner et al. | 1/1 |
| 6,085,160 | A | * | 7/2000 | D'hoore et al. | 704/256.2 |
| 6,442,518 | B1 | * | 8/2002 | Van Thong et al. | 704/235 |
| 6,473,778 | B1 | * | 10/2002 | Gibbon | 715/201 |
| 7,035,468 | B2 | * | 4/2006 | Yogeshwar et al. | 382/232 |
| 7,047,191 | B2 | * | 5/2006 | Lange et al. | 704/235 |

(Continued)

OTHER PUBLICATIONS

Bachenko, Joan et al., A Parser for Real-Time Speech Synthesis of Conversational Texts, Proceedings of the ACL Conference on Applied Natural Language Processing, Apr. 1992.*

(Continued)

*Primary Examiner* — Nasser Goodarzi
*Assistant Examiner* — Michael B Pierorazio
(74) *Attorney, Agent, or Firm* — Dorsey & Whitney LLP (57) ABSTRACT

A synchronization process between captioning data and/or corresponding metatags and the associated media file parses the media file, correlates the caption information and/or metatags with segments of the media file, and provides a capability for textual search and selection of particular segments. A time-synchronized version of the captions is created that is synchronized to the moment that the speech is uttered in the recorded media. The caption data is leveraged to enable search engines to index not merely the title of a video, but the entirety of what was said during the video as well as any associated metatags relating to contents of the video. Further, because the entire media file is indexed, a search can request a particular scene or occurrence within the event recorded by the media file, and the exact moment within the media relevant to the search can be accessed and played for the requester.

20 Claims, 5 Drawing Sheets

(56) References Cited

U.S. PATENT DOCUMENTS

| | | | |
|---|---|---|---|
| 7,065,524 B1 * | 6/2006 | Lee | 1/1 |
| 7,092,888 B1 * | 8/2006 | McCarthy et al. | 704/277 |
| 7,110,664 B2 * | 9/2006 | Yogeshwar et al. | 386/328 |
| 7,509,385 B1 * | 3/2009 | Rittmeyer et al. | 709/206 |
| 7,729,917 B2 * | 6/2010 | Miyamoto et al. | 704/270 |
| 7,739,253 B1 * | 6/2010 | Yanovsky et al. | 707/705 |
| 7,801,910 B2 * | 9/2010 | Houh et al. | 707/765 |
| 7,908,628 B2 * | 3/2011 | Swart et al. | 725/93 |
| 7,962,331 B2 * | 6/2011 | Miller et al. | 704/215 |
| 8,121,432 B2 * | 2/2012 | Dorai et al. | 382/276 |
| 8,131,545 B1 * | 3/2012 | Moreno et al. | 704/235 |
| 8,209,724 B2 * | 6/2012 | Rathod et al. | 725/53 |
| 8,248,528 B2 * | 8/2012 | Hosking et al. | 348/468 |
| 8,423,363 B2 * | 4/2013 | Gupta et al. | 704/255 |
| 8,572,488 B2 * | 10/2013 | Phillips et al. | 715/716 |
| 2002/0055950 A1 * | 5/2002 | Witteman | 707/500.1 |
| 2002/0093591 A1 * | 7/2002 | Gong et al. | 348/515 |
| 2003/0025832 A1 * | 2/2003 | Swart et al. | 348/461 |
| 2003/0061028 A1 * | 3/2003 | Dey et al. | 704/9 |
| 2003/0169366 A1 * | 9/2003 | Lenzi et al. | 348/461 |
| 2003/0206717 A1 * | 11/2003 | Yogeshwar et al. | 386/69 |
| 2004/0096110 A1 * | 5/2004 | Yogeshwar et al. | 382/239 |
| 2005/0227614 A1 * | 10/2005 | Hosking et al. | 455/3.06 |
| 2006/0015339 A1 * | 1/2006 | Charlesworth et al. | 704/251 |
| 2007/0124147 A1 * | 5/2007 | Gopinath et al. | 704/257 |
| 2007/0124788 A1 * | 5/2007 | Wittkoter | 725/112 |
| 2008/0066138 A1 * | 3/2008 | Bishop et al. | 725/137 |
| 2008/0262996 A1 * | 10/2008 | Yogeshwar et al. | 707/1 |
| 2008/0266449 A1 * | 10/2008 | Rathod et al. | 348/468 |
| 2008/0270134 A1 * | 10/2008 | Miyamoto et al. | 704/251 |
| 2009/0171662 A1 * | 7/2009 | Huang et al. | 704/251 |
| 2010/0091187 A1 * | 4/2010 | Topiwalla | 348/468 |
| 2011/0040559 A1 * | 2/2011 | Kim et al. | 704/231 |

OTHER PUBLICATIONS

Church, K. Char-align: A Program for Aligning Parallel Texts at the Character Level, Association for Computational Linguistics, pp. 9-16, 1993.*

Gale, William A. et al., A Program for Aligning Sentences in Bilingual Corpora, Computational Linguistics, 1993.*

Hwang, M., et al., "Improving Speech Recognition Performance via Phone-Dependent VQ Codebooks and Adaptive Language Models in SPHINX-E." ICASSP-94, vol. I, pp. 549-552. 1994.*

Ravishankar, M., Efficient Algorithms for Speech Recognition. Ph.D Thesis, Carnegie Mellon University, May 1996, Tech Report. CMU-CS-96-143.*

Witbrock, Michael J. et al., Improving Acoustic Models by Watching Television, Carnegie Mellon University CMU-CS-98-110, 1998.*

* cited by examiner

CAPTION AND/OR METADATA SYNCHRONIZATION FOR REPLAY OF PREVIOUSLY OR SIMULTANEOUSLY RECORDED LIVE PROGRAMS

RELATED APPLICATIONS

The application claims priority under 35 U.S.C. §119(e) to U.S. Provisional Application Ser. No. 61/244,823, filed Sep. 22, 2009. which is herein incorporated by reference in its entirety.

This application also cross references U.S. nonprovisional application Ser. No. 12/429,808, entitled METATAGGING OF CAPTIONS" and filed on Apr. 24, 2009, which is herein incorporated by reference in its entirety.

TECHNICAL FIELD

The technology described herein relates to a synchronization process between closed-captioning data and/or associated metadata and the video and/or audio with which the closed captioning and/or metadata is associated.

BACKGROUND

Closed-captioning of television and other media programs is often provided in order for people with hearing impairments to understand the dialogue in a program. Often live broadcasts, for example, news programs, award shows, and sporting events, are captioned in real time by transcriptionists watching a feed of the program and/or listening to an audio feed for the program (such as via a telephone or voice over Internet protocol connection) which may be a period of time (such as 4-6 seconds) ahead of the actual live broadcast time. Naturally, there is a delay in the presentation of the closed caption information to a hearing-impaired viewer because of the time it takes the transcriber to type the words spoken after hearing them and because the feed utilized by the transcriptions is typically a short period of time ahead of the actual live broadcast. Presently, when such programs are streamed real time or recorded, the closed captions remain in the vertical blanking interval of the original frames in an analog signal or in the same location within the bit stream or data packet of a digital signal. Thus, upon receipt of the streamed live program and/or replay of a recording of the original live program, the closed captioning is still delayed and is not simultaneous with the actual spoken words or sounds in the program.

Fundamentally, the Internet is about text. Internet search engines (e.g., Google®) parse the text of the pages in websites and index it. When an Internet search is performed, it is this index of the text that is analyzed. Local searches on desktop computers (e.g., "Find" commands, Apple® "Spotlight" software, or Microsoft Windows "Search") are similarly basically text searches for words or phrases in a document, file names, and metadata about a file (e.g., author, file creation date, etc.). Digitally recorded video and audio have traditionally been fairly opaque with regard to search engines, either local or Internet-based. For example, the Google® search engine cannot process recorded video in any meaningful way—only the text that surrounds the video is indexed. This indexing is thus typically limited to the title of the video, a few keywords (assuming the site uses "tagging" of some sort), and possibly the date that the recording was made. There is currently no way to conduct a deeper search of the video to identify particular content, for example, occurrences of names, places, music, events, or occurrences.

The information included in this Background section of the specification, including any references cited herein and any description or discussion thereof, is included for technical reference purposes only and is not to be regarded subject matter by which the scope of the disclosure is to be bound.

SUMMARY

A synchronization process between closed-captioning data and/or corresponding metatags and the video or audio with which the closed captioning is associated parses the video and audio files, correlates the caption information and/or metatags with segments of the audio files, and provides a capability for textual search and selection of particular scenes or segments. A time-synchronized version of the closed captions delivered during the presentation of an event, for example, a television program, a lecture delivered in a classroom, or any number of other types of events, is created such that upon re-streaming of the event presentation and/or replay of a recording of the event presentation, the captions are automatically synchronized to the moment that the speech is uttered in the recorded media. Search functions may be conducted on locally stored media files or via the Internet to search a vast library of video and audio files that may be available for access and presentation.

The caption data, i.e., effectively the complete text of what is spoken throughout the media, is leveraged to enable search engines like Google® to index not merely the title of a video, but the entirety of what was said during the video as well as any associated metatags relating to contents of the video. Further, because the entire media file is indexed, a search can request a particular scene or occurrence within the event recorded by the media file, and the exact moment within the media relevant to the search can be accessed and played for the requester. The technology disclosed herein automates the correlation of the caption segments to audio segments in a media file of the event, thereby providing an association between time stamps in the media file and searchable text. The connection between the captions and video allows a consumer to jump directly to a pertinent or desired section of video.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present disclosure is provided in the following written description of various embodiments of the disclosure, illustrated in the accompanying drawings, and defined in the appended claims.

DETAILED DESCRIPTION

In order to provide searchable media files to an end user, three basic steps or functions may be performed. First, an event is captured and transformed into a media file. Second, the event, and primarily the audio portion of the event, is captioned and further annotated with metadata. Third, the captioned audio and any metadata are synchronized with the corresponding content in the media file. In some implementations, the media files and the associated captioning and metadata creation occurs in real-time (i.e., as an event takes place or with a minimal delay, e.g., less than a minute) providing substantially immediate search capability for media files.

Figure 1:
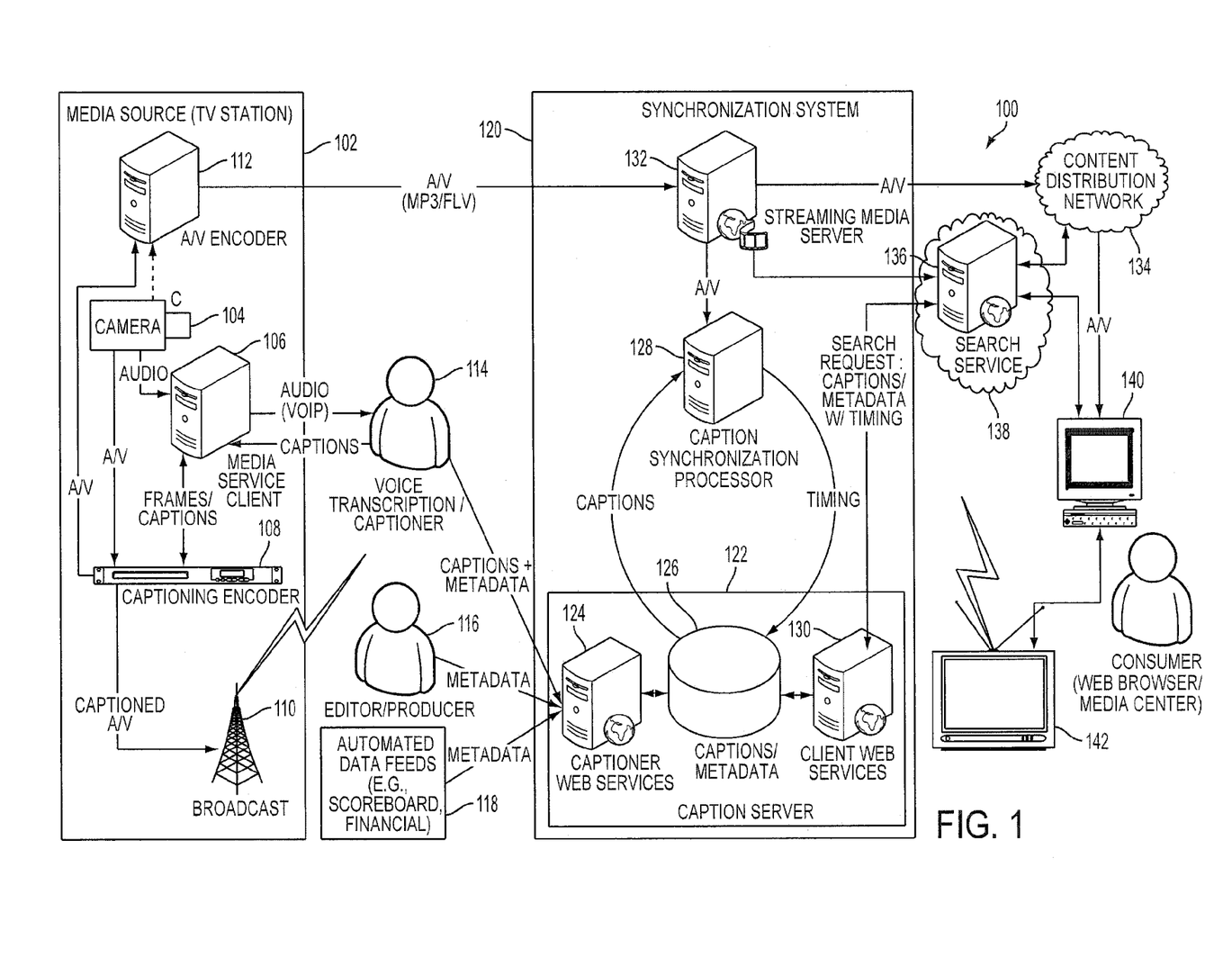
FIG. 1 is a schematic diagram of a network system for synchronizing closed captioning in a broadcast event to provide a searchable media file.

FIG. 1 is an example implementation of an audio/video search system 100 that processes and formats audio, video, or combined audio-video (individually and collectively "media files") to be searchable by a user in order to pinpoint and play content occurring at a particular time within the media file. The media file may be a real-time or pre-recorded audio signal or file, video signal or file, or combined audio/video signal or file containing data corresponding to an event. An "event" is defined herein as any live or prerecorded programming including television shows, newscasts, movies, live performances, lectures, symposiums, teleconferences, courtroom proceedings, sporting events, or any other live or recorded proceeding, display, or activity that may be captioned or transcribed. Preferably the event is in the form of a media file that includes an audio component capable of transcription. However, an event could be a video only file that is annotated with metadata.

In FIG. 1 a media source 102 performs the event capture function. It should be noted that in the example implementation of FIG. 1, a television station is depicted as the media source 102. However, many other systems may function as an appropriate media source. Among these may be, for example, a radio station; output from public address equipment at a live concert, a speech, a lecture, a symposium, or other similar event; a teleconference system; a playback device (e.g., a CD player, DVD player, VCR, cassette player, turntable, etc.) for presenting a prerecorded film or television show or music or other audio recording stored on physical media; or any other event or programming that can be recorded or otherwise function as a media source 102.

In the example of FIG. 1, the TV station media source 102 generates content through its television camera 104 that records audio and video signals from live programming, for example, a newscast. Other live programming may originate at an event location outside of the television station, for example, at a sporting event, but the live audio/video signal is transmitted back to the TV station for processing before broadcast.

One type of processing of live programming is the closed captioning of audio/video programs for the hearing impaired. When a live event or other programming is selected for closed captioning, the audio portion of the recording may be sent to a media service client 106 to begin the captioning process. The media service client 106 may be a computer that, in part, processes and transmits the audio portion of the audio/video signal or other media file to a voice transcriptionist or captioner system 114 for preparation of captions of the media program.

The term "captioner" is used herein to refer to either a person or an entity and the hardware and software system used by the person or entity to create captions. The captioner 114 may receive an audio file in real-time as the event is taking place or may receive an audio file of a prerecorded event for captioning. Although possible, in practice the captioner 114 generally does not receive the video information associated with the media file. The captioner 114 may transcribe the audio file 110 and generate other caption content and/or data using a stenotype or other transcription device (e.g., a voice writer using a stenomask). The transcription device any be part of a larger computer controlled transcription system, e.g., the Bison Interactive Captioning Console ("BICC") or other suitable captioning system. For live events, the captioner 114 may transcribe the audio portion of the event as it occurs substantially in real time. Additionally, non real-time resources such as recorded video, audio, lectures, court proceedings, audio books, and other media may be captioned for replay including caption presentation at any future time.

"Caption information" or "captions" may include transcription text as well as other verbal or nonverbal content or data that additionally describes the event, for example, identification of speakers; indication of laughing and/or music; formatting information so that the text may be displayed on video screens (which is generally not shown on a viewer display); chevrons, carets, or other indicators of pauses, changes between speakers, or other transitions.

The captioner system 114 may be located at the media source 102, e.g., at the TV or radio station or at a particular event (e.g., at a lecture), or the captioner 114 may be located remotely from the media source 102 and receive the audio file from the media source 102 over a network (e.g., the Internet, a local-area network, a wide-area network, a wired network, a wireless network including infrared, radio frequency, and Bluetooth networks), via real-time audio transmission (e.g., voice over Internet protocol (VoIP)). In an alternative implementation, the captioner 114 may receive the audio portion of the programming via a standard telephony system. Regardless of the method of receiving the audio portion of the event, the captioner 114 prepares a written transcript of the audio portion of the event. The captioner 114 may use a stenotype or other standard transcription device to transcribe any spoken dialog within an event.

The captioner 120 may use pre-defined keystrokes or voice commands that correspond to words, phrases, names, or other terms when generating the caption file from the audio file 110. Generally, words, phrases, names, and other terms may be programmed as specific keystrokes (including combinations of keystrokes) on the captioning device. Certain common groups of letters, words, and/or phrases, may be mapped to a single keystroke or a combination of keystrokes. Such shortcut keystrokes may be previously defined by the captioner 114 and stored in a dictionary. The dictionary may be a file stored in the captioning device or an associated computing device or storage medium. This allows the captioner 114 to use fewer keystrokes to spell commonly used, long and/or complex terms, and/or names during captioning of the event and thus allows the captioner 114 to caption faster and more accurately. For example, a football player's name may have a long and/or complex spelling. By assigning the football player's name to certain keystrokes on the captioning device, the captioner may prevent misspelling the football player's name and may be faster when transcribing the words spoken during the football game.

In addition to transcribing spoken words, the captioner 114 may additionally indicate a specific occurrence within the event. Keystrokes may be used to provide embedded metadata information in the text code of the caption file to provide additional information (e.g., biographical, geographical, statistical, temporal or other information) pertaining to the captioned event. Other types of metadata may include statistical information regarding individuals participating in the event, video portions of the event, phrases, places and/or people associated with the event, specific occurrences in the event itself, or any combination thereof. For example, during a live sporting event the captioner 114 may hit a specially designated key or keystrokes on the stenotype to indicate that the next segment of captioning corresponds to an occurrence within the event, rather than transcription of spoken words. Using the example of a football game, the captioner 114 may hit a preprogrammed series of keystrokes to indicate the occurrence of a touchdown, the beginning or end of a quarter, the present "down", or even the moment when each particular play begins. By identifying this additional information outside of a straightforward transcription with special keystrokes, such information may be designated as metadata about the event and may be identifiable for use or storage separately from the captions.

As the captions are transcribed by the captioner 114, they are transmitted back to the media service client 106 via the network. The captioner 114 may format the caption data into a file format appropriate for the media service client 106 or other receiver. For example, the caption data may be formatted into a data file (such as an XML file) compliant with a closed captioning standard such as EIA-608, generally referred to as "line 21" captioning, compatible for receipt and/or processing by various devices such as television receivers and computing devices. The media service client 106 then sends the received captions to a captioning encoder 108 for combination with the audio/visual signal received from the camera 104. The captioning encoder 108 inserts the captions into the audio/video signal, for example, within the vertical blanking interval or, if within a digital transmission, in packets with appropriately coded headers indicating that the packets contain captioning information. The captioned audio/video signal is then transmitted by a broadcast transmitter 110 for reception by consumers. The broadcast transmitter 110 may be a terrestrial antenna transmitter, a cable television network head end, a satellite television service uplink, or even a network server that provides streaming audio/video output over the Internet.

In the embodiment shown in FIG. 1, an audio/video encoder 112 at the media source 102 transforms the captioned audio/video signal from the captioning encoder 108 into a streaming media signal for transmission over a network. In an example form, the audio portion of the signal may be compressed into an MPEG-1, Audio Layer 3 (MP3) format while the video signal may be transformed into a Flash video file (fly). Alternatively, an audio/video signal without the captioning information taken from the camera 104 or other recording device may be processed and streamed by the audio/video encoder 112 to transmit a media file without the captioning information.

The next significant component of the audio/video search system 100 involves the creation of metadata information, e.g., in the form of tags, that additionally describe the media event. As previously discussed, the captioner 114 may be charged with creating metadata about a particular event while simultaneously transcribing the speech or dialog. In addition to the captioner 114, an editor or producer 116 may additionally prepare metadata information related to a particular event. Such information may include a unique numerical identifier for the event, the title of the event, a date the event was first aired, and other information regarding the event. For example, continuing with the football game event, such information may include the names of the teams playing, names of coaches, and names of star athletes on the teams. For alternate types of events, metadata provided by the producer 116 may include episode titles, and actor and director names, plot synopses, and other information. The producer 116 may alternatively be an automated editing system. The editing system may edit the caption file for grammar and spelling and may additionally insert metadata. Words, people, phrases, subject matter, concepts, related terms, references to other sources of similar terms, places, specific happenings in the captioned event, and other textual cues may be identified by the editing system as prompts for insertion of corresponding metadata.

In addition to captioner 114 and producer 116 generated metadata, other automated sources of metadata 118 may be accessed. For example, a "scoreboard" data feed may be accessed to provide real-time scores for multiple sporting events that may be processed within the audio/video search system 100 to correlate various scores with corresponding events or programs. Other automated data feeds may include financial information, or any other information from a real-time data source. In one implementation wherein the producer 116 is an automated editing system, the producer 116 may operate in conjunction with an automated data feed 118 to associate the data from the automated data feed 118 with textual cues identified in the captions.

The third primary component of the audio/video search system 100 is the synchronization system 120. The synchronization system 120 is additionally composed of three major components: a caption server 122, a caption synchronization processor 128, and a streaming media server 132. The caption server 122 is further composed of a captioner web service portal 124, a caption and metadata database 126, and a client web services portal 130. The captioner web services portal 124 provides a link between the synchronization system 120 and the captioner device 114, the producer device 116, and the automated metadata feeds 118. The transcribed captions generated by the captioner 114 are transmitted to the captioner web services portal 124 (in addition to the media service client 106) where they are processed and formatted for storage in the database 126. Similarly, metadata generated by the captioner 114, the producer 116, and/or the automated metadata feeds 118 are received at the captioner web services portal 124 where they are similarly processed and formatted for storage within the database 126.

While the closed caption transcription prepared by the captioner 114 is created and inserted into the audio/video signal as close to real time as possible (when accounting for the transcription and processing delays), other than the physical placement of the captions within the broadcast signal, there may be no further tie of the captions to the corresponding audio/video data. The purpose of the synchronization system 120 is thus to correlate the captions and, in some instances, the metadata with the specific time that the corresponding speech or occurrence occurs within the audio/video segments of the event. The streaming media server 132 receives the audio/video file from the audio/video encoder 112 at the media source 102 and provides the audio/video file to the caption synchronization processor 128 for synchronization with the captions and metadata.

The caption synchronization processor 128 accesses the captions and any metadata embedded with the captions by the captioner 114 from the database 126 for processing in conjunction with the audio/video file. Details of an example synchronization processing method are presented with respect to FIGS. 2-4 later herein. In general, the caption synchronization processor 128 analyzes the audio component of the media file, translates the audio using language recognition algorithms into likely sound phrases, and matches the captions with the sounds phrases to correlate them with the precise time sequence within the audio file. A time stamp is then associated with the caption segment corresponding to the audio segment and stored as another metadata field for the particular event within the database.

Depending upon the type of event, in some implementations video information may also be analyzed in order to identify additional metadata and associate a time stamp with such data. For example, video frames of a sporting event may be analyzed to search for images of a scoreboard. The images could then be processed and parsed to identify the period of play, the time remaining, the score, and other information (e.g., in a football game, the particular "down"). This metadata information could then be associated with a time stamp corresponding to the point in the video component of the media file in which the analyzed frame appeared. Again, this additional metadata and timing information may be stored in the database 126 as associated with the particular event.

As an additional function, the caption synchronization processor 128 may further implement copyright controls with respect to the media file. For example, the producer 116 may identify a particular event or program as subject to copyright restrictions and place such restriction information within the metadata associated with the media file. An example restriction may be understood in the context of a television news broadcast in which the right to use clips of professional sporting events may be contractually limited by the professional sports leagues. Thus, a producer may want to remove such content from the media file on the streaming media server 132 before it is provided for access and download by consumers. Once the caption synchronization processor 128 has correlated the audio portion of the media file to the caption information, it may be possible to identify that portion of the event that the producer 116 has flagged for copyright control restrictions and provide the appropriate timing information to the streaming media server 132 to ensure that such segments are blocked from transmission.

In a further aspect of this implementation, to the extent that metadata corresponding to automated data feeds 118 has associated real-time time stamps, the caption synchronization processor 128 may additionally access such metadata from automated feeds and correlate the real-time time stamps of those feeds with the relative time stamps within the media file. In this way metadata from automated data feeds may be associated with particular time periods of the recorded event within the media file.

Once the synchronization system 120 has correlated time stamps between the media file and the captions and metadata associated with the particular event or program, the media file is fully searchable, allowing a consumer to search for a media file of a particular event and to further search for specific scenes or occurrences within the event for pinpoint presentation of such scenes or occurrences to the user. As shown in the example implementation of FIG. 1, a consumer may use a personal computer 140 with a web browser or similar client computer searching presentation software to conduct a network search, for example, over the Internet, for a media file of a particular event. The consumer may further specify as part of the search parameters a particular scene or occurrence within the event or program.

Returning to the football game example, the consumer may specify as part of the search parameters that he would like to see a particular fourth quarter touchdown by a particular team in a particular game. The consumer can transmit this specific query across the network 138 to a search service 136 (e.g., Google). The search service 136 may send a request to the synchronization system 120 to identify an event meeting the search criteria. The client web services portal 130 may query the database 126 to identify the corresponding event based upon the caption information and associated metadata stored within the database 126. If a particular scene or occurrence within the event was requested within the search parameters, the timing information identifying the relative location within the media file will be returned to the search service 136. The search service can then identify and retrieve the desired media file either directly from the streaming media server 132 or via a content distribution network 134 that provides a greater ability for multiple simultaneous access to media files.

The search service 136 can then pass the location of the particular media file within the content distribution network 134 to the consumer computer 140 and further provide the time stamp information indicating the relative time within the media file of the requested scene or occurrence. The consumer computer 140 can then request delivery of that portion of the media file meeting the search criteria.

FIG. 1 also shows an example auxiliary implementation of this process providing a consumer having appropriate hardware and software equipment with an augmented live television viewing experience. As shown in FIG. 1, a consumer's television 142 may receive a broadcast transmission of a live event transmitted by the broadcast transmitter 110 of the media source 102. Presuming that all the processing performed by the captioner 114, the media source 102, and the synchronization system 120 occurs in real time as well, the consumer may be able to request replays of specific scenes or occurrences in real time.

The consumer may also be able to request presentation of additional information regarding the program provided by the metadata associated with the programming during the captioning and synchronization processes. For example, if the consumer computer 140 is configured as a media center and is connected to a television 142, the consumer may have access to additional content available for presentation on the television 142 via the media center 140.

Returning to the example of the live broadcast of a football game, the consumer could pause the live presentation of the football game on the television (e.g., using digital video recorder functionality provided by the media center 140 or a separate special purpose DVR component). Through an interface provided by the media center 140 on the television 142, the consumer could initiate a search for a specific prior scene or occurrence within the football game. Rather than searching through the entire program stored on the local DVR, the media center 140 may send a search request over the network 138 to the search service 136 with a request for the specific scene or occurrence. As previously described, the search service 136 may query the client web services portal 130 to provide a match for the requested content and then identify the content on the content distribution network 134 providing a specific time stamp for the media segment corresponding to the search request. The segment could then be transmitted from the content distribution network 134 to the media center 140 for presentation on the television 142 of the consumer.

Additionally or alternatively, the consumer may use the media center 140 to request additional information about the event being presented on the consumer's television 142. Again, the media center 140 may generate a query to the search service 136, which polls the client web services portal 130 and requests metadata information from the database 126 related to the programming presented on the television 142. The search service 136 may return such metadata to the media center 140 which may then format the metadata information for appropriate presentation in conjunction with the program presentation on the consumer's television 142.

Having discussed capturing events, transforming the captured events into media files, captioning the audio portions of events, and annotating the captioned audio with metadata, the discussion will now turn to the process of synchronizing the captioned audio and any metadata for captured events with the corresponding content in the media files. This synchronization will now be elaborated in detail.

Figure 2:
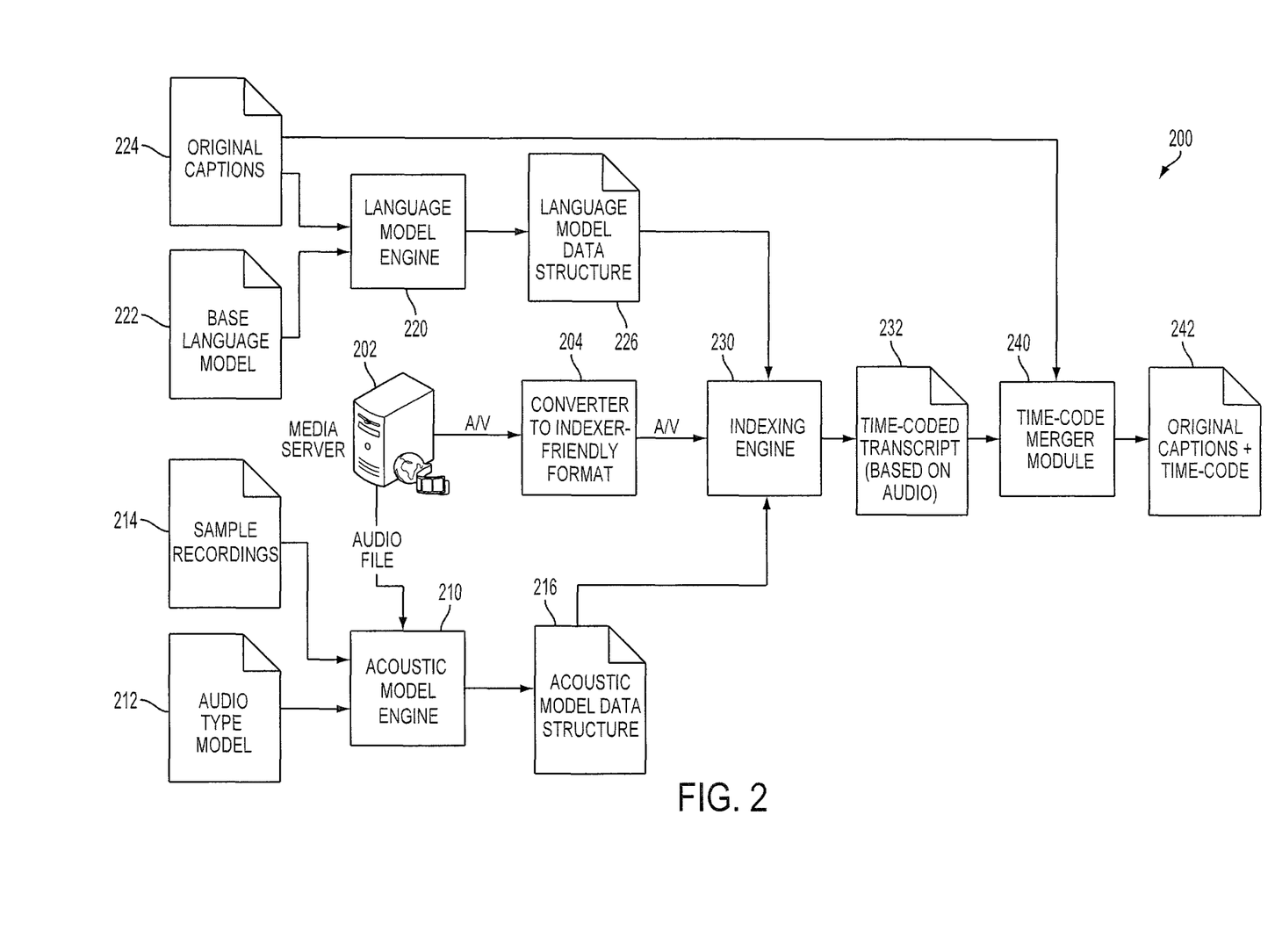
FIG. 2 is a combined schematic and process flow diagram of primary process modules, including inputs and outputs, for synchronizing closed captioning in a recorded event to provide a searchable media file.

In an example implementation as shown in FIG. 2, the synchronization process 200 may be viewed as performed by three main engines: an acoustic model engine 210, a language model engine 220, and an indexing engine 230.

The acoustic model is used to describe the nature of the audio signal to be processed. For example, a telephone signal is compressed in a very specific way, with certain frequencies being heavily emphasized and others left out almost entirely. The acoustic processing translates the audio signal into a sequence of logical word sounds (e.g., similar to phonemes). Acoustic models based on sample recordings may also be used to help the acoustic model engine better process the audio into the most likely word sounds.

The second part of the process is the language model. A language model engine may be used to construct and merge language models. Essentially, the language model is built up from hundreds or thousands of pieces of speech that have been transcribed to text. It's essentially a collection of statistics that describe sequences of logical word sounds and the odds that they represent a given word or group of words. An example language model engine is available from Sail Labs, Austria.

In one implementation, the language model engine may be used to combine a "base" language model and an "event specific" language model. The base language model may be composed of a large amount of text that is not specific to the event being processed. Statistics may be further derived from the actual transcript of the event that is being processed to create the event specific language model. A time stamp from the place in the recording where the word sound occurs is associated with each word sound.

Once the precise moment during the audio where each word sound comes from is known, the word sounds may be grouped back together as words and a precise time stamp can be related to the moment when each word in the recording begins and ends. Hence, the audio input is processed to produce a time-coded sequence of words that (based on the language model) are the most likely things said throughout the recording.

The language model is used to process the output of the acoustic model to put the word sounds taken from the audio into the most likely string of words that would have been built from those logical word sounds. An indexing engine processes the audio, using the output of the acoustic model engine and the language model in order to produce time-indexed text. A batch file or script may be used to automate the steps to create an event-specific language model and then to execute the indexing engine on the audio file.

The timing from the transcript created by the indexing engine is applied to the original captioner-built transcript text. The timing information output from the indexing engine is aligned with the original transcript. The indexing engine produces a transcript with timing information, but the transcript it produces is generally not exactly the same as the one originally produced by the captioner. Captioners make mistakes and often will paraphrase in order to keep up with fast-moving speech. As a result, there will be times when the transcript text is not a verbatim account of what was spoken. The indexing engine produces a "best-guess" word or phrase for everything said in the audio. Therefore, if the two transcripts are compared, there will be some sequences where both the words are identical and others where the words either do not match or line up at all.

Several outputs may be received from the process and delivered to a common output directory. First, a new copy of the original closed-caption transcript with the caption segments maintained per the original transcript is saved. Timing for each line of captions is updated to match the first line of the caption with the time at which that word is spoken in the media. A best approximation may be considered acceptable should the specific word from the transcript not be located by the voice recognition engine. In one embodiment, the file format may be in W3C Timed Text Interchange format. (See http://www.w3.org/AudioVideo/TT/.) File naming is not material, but it may be practical that the core of the file name matches the code name of the original transcript and media.

Second, a new copy of the original closed-caption transcript in which each word is individually annotated with the time at which it appears is saved. Again, a best approximation may be considered acceptable should the specific word from the transcript not be located by the voice recognition engine. In one embodiment, the file format may be in W3C Timed Text Interchange format. File naming is not material, but it may be practical that the core of the file name matches the code name of the original transcript and media.

Figure 3:
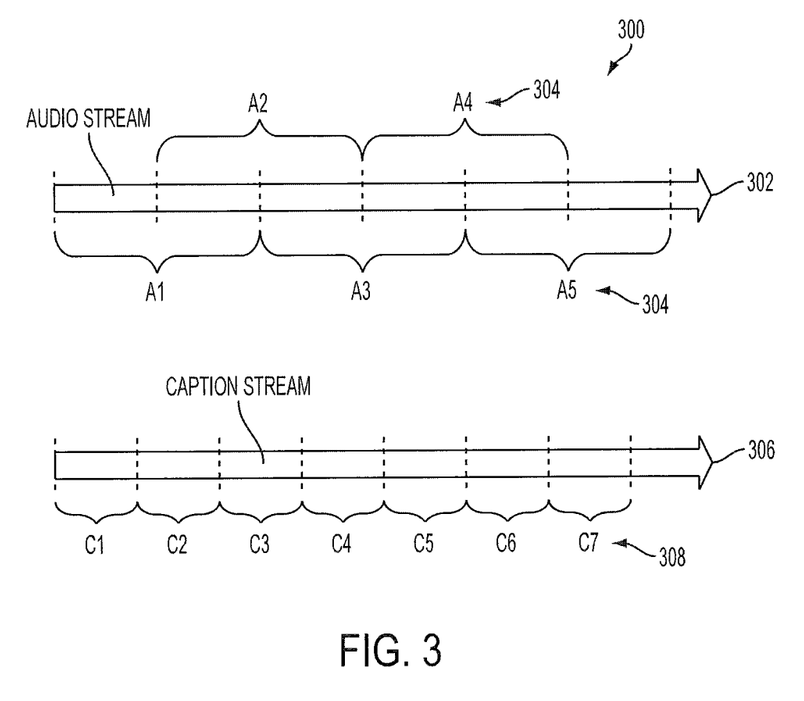
FIG. 3 is a schematic diagram comparing audio segments in a media file to caption segments corresponding to the media file.

FIG. 3 is a schematic diagram of an audio stream 302 of an event compared to a caption stream 306 of closed captions transcribed from the audio stream 302. As depicted in FIG. 3, the audio stream may be divided into multiple audio segments 304. Similarly the caption stream 306 may be divided into a plurality of discrete caption segments 308. The creation of caption segments 308 is a standard methodology in the closed captioning process. Note that the audio segments 304 of the audio stream are not discrete like the caption segments 308, but instead overlap in order to maximize the chance of fluid and complete translation of the audio stream by the language model engine as described with respect to FIG. 2. As shown in FIG. 3, the audio segments 304 overlap with adjacent segments. For example, audio segment A2 overlaps the last half of audio segment A1 and the first half of audio segment A3. Similarly audio segment A3 overlaps the last half of audio segment A2 and the first half of audio segment A4, and so on.

Figure 4:
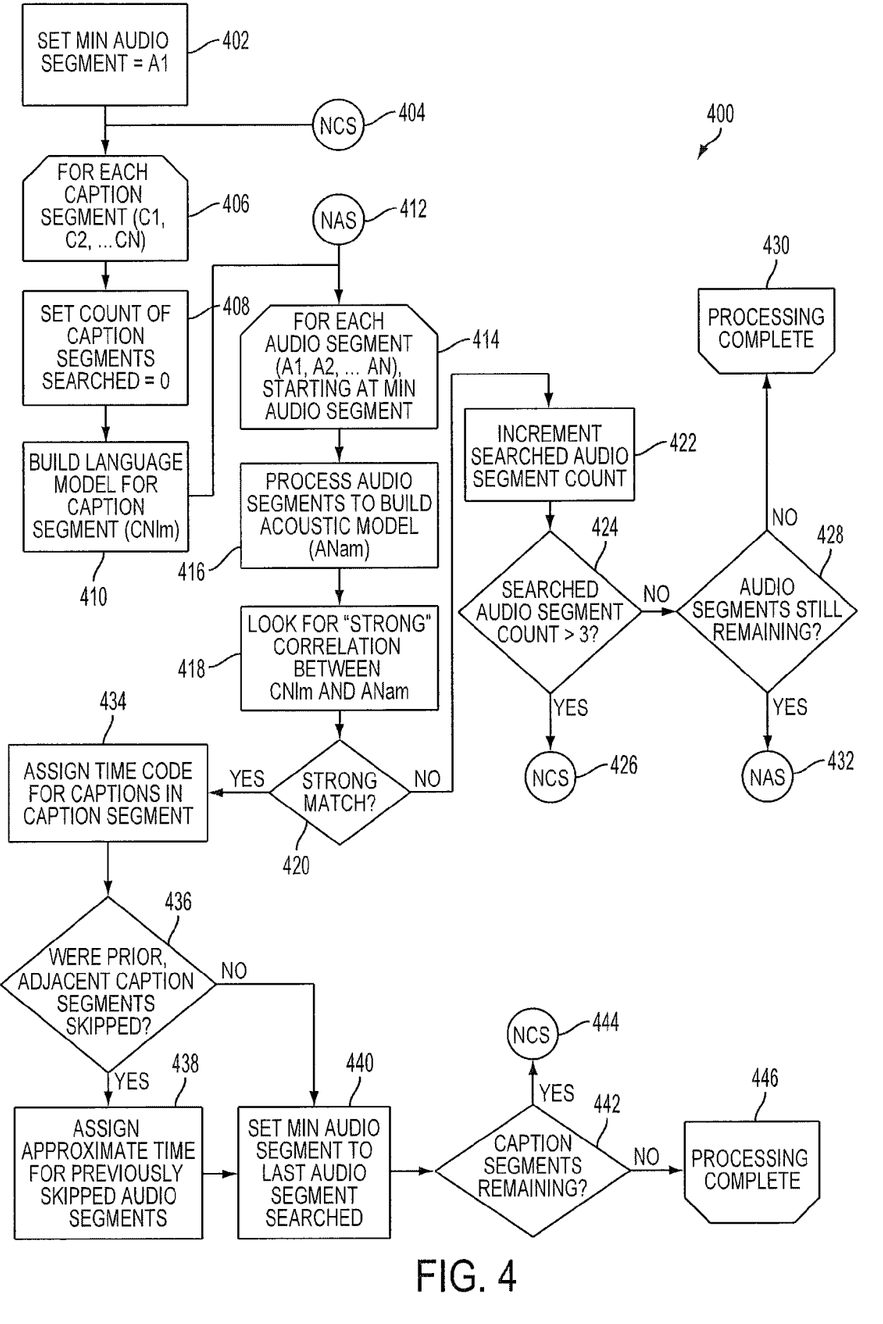
FIG. 4 is a flow diagram of an example process for synchronizing caption segments with audio segments in a broadcast event to provide a searchable media file

The benefit of overlapping the audio segments 304 in FIG. 3 can be seen in the example process of synchronization for providing audio and/or video search functionality as shown in FIG. 4. The synchronization process shown in FIG. 4 presents the processing of one audio segment at a time. However, it should be understood that the synchronization process 400 may be conducted to process several or many audio segments and related caption segments at the same time (in parallel) in order to reduce delay in providing searchable media files and provide as near a real-time experience for live presentations as possible.

An example synchronization process for a search 400 may begin with a setting operation 402 in which the minimum audio segment for the process is initially designated as the first audio segment (A1) of the media file. A first caption segment is selected for processing in selection operation 404. As the process 400 iterates, the selection operation 404 selects the next caption segment in the sequence of caption segments related to the media file for processing.

A processing loop for each caption segment now begins at loop limit indicator 406. First, for each loop a counter of caption segments searched is set to 0 in operation 408. Next, a language model of "quasi-phonemes" is developed for the selected caption segment in operation 410. This language model may be built by the language model engine as previously described with respect to FIG. 2. The minimum audio segment is selected as the next audio segment in selection operation 412.

Once an audio segment is selected for processing, an internal loop for each audio segment, starting with a minimum audio segment, begins as indicated by loop limit 414. The selected audio segment is then processed to build an acoustic model of the audio segment as indicated in operation 416. This process may be performed by an acoustic model engine as previously described with respect to FIG. 2. Next, the data structure of the language model for the selected caption segment is compared to the data structure of the acoustic model of the selected audio segment in order to determine whether there is a strong correlation between the two as indicated in operation 418. A strong correlation would indicate that the audio segment corresponds to the audio transcription of the caption segment.

A decision is indicated in query operation 420. If there is not a strong match between the caption segment and the audio segment, then the audio segment counter is incremented by 1 in operation 422. An analysis of the counter is also conducted to determine whether more than three audio segments have been compared to the caption segment as indicated in query operation 424. The searched audio segment counter cap of three segments is an arbitrary selection based upon what is likely to be a reasonable number of audio segments to compare with a caption segment to find a correlation between a caption segment and an audio segment.

If three audio segments have been searched and compared to a caption segment then the process 400 will jump to select a new caption segment as indicated by link 426 to the next caption segment selection operation 404. The premise for selecting a new caption segment is that, although there was not a strong match to the prior caption segment, a correlation between the next caption segment and the audio segments previously searched may likely be found as the audio segments are typically longer than the caption segments. A caption segment may not match an audio segment at any given time for a number of reasons. First, the caption segment may have been mis-keyed by the captioner or poorly processed by the language model engine. Second, the audio segment could be garbled or difficult to parse due to background sound (e.g., music or explosions). Third, there may be a period of silence in the audio track before speech and therefore a delay before captioning occurs. In this case, all the captions will be checked against successive groups of audio segments until a match is made in order to ensure that the lack of a match is not due to the first and second issues with the caption or audio quality described above.

It should be understood that the described searching of three audio segments is an arbitrary selection of a reasonable number of audio segments to compare with a caption segment to find a correlation between a caption segment and an audio segment. In various implementations, the number of audio segments to compare with a caption segment may be a number other than three, may be configurable, and may vary as audio segments are compared with caption segments.

Further, as part of comparing audio segments with caption segments, in some implementations leading silence of the audio segments and/or the entire audio portion of the media file may be eliminated for purposes of comparison utilizing various audio processing techniques. For example, in some implementations, audio segments and/or the entire audio portion of the media file may be shortened by audio processing techniques to actually remove the leading silence from the audio segments and/or the entire audio portion of the media file. In other implementations, audio processing techniques may be utilized to determine offsets to effectively eliminate leading silence from the comparisons.

Returning to query operation 424, if the searched audio segment count is still less than three, a further determination is made as to whether any audio segments still remain as indicated by query operation 428. If all the audio segments have already been searched and there is no correlation between the audio segments and the caption segments searched, then the process terminates as indicated by loop terminator 430. If, however, additional audio segments remain to be searched, then the process moves from query operation 428 to jump operator 432 to jump to selection operation 412 to select the next audio segment for comparison.

Returning to query operation 420, if a strong match or correlation between a caption segment and an audio segment is found, then the process 400 moves to assign a time code to the captions in the caption segment that correlates to the time stamp of the audio segment within the media file as indicated by assignment operation 434. Once a time stamp has been assigned to a caption segment, a query operation determines whether prior adjacent caption segments were skipped as a result of query operation 424 for failure to find a strong correlation between those prior caption segments and an audio segment. If it is found that prior adjacent caption segments were skipped, then those skipped caption segments will be assigned an approximate time stamp as indicated in operation 438. In this case, the time stamp may be the same time stamp as allocated to the present caption segment or it may be a time stamp associated with one or more of the immediately prior audio segments that may have been skipped for a lack of correlation with the caption segment.

In either case, that is, whether prior adjacent caption segments were skipped or not, the process continues to operation 440 in which the minimum audio segment is reset to the last audio segment searched. Note that the minimum audio segment is not set to the next audio segment, but remains as the last audio segment searched because the audio segments are generally longer than the caption segments as indicated in FIG. 3. Thus multiple caption segments may be associated with a single audio segment.

Once the minimum has been reset, the process 400 determines whether any caption segments remain to be correlated as indicated in query operation 442. If additional caption segments do need to be correlated, then the process 400 jumps back to selection operation 404 to select the next caption segment for analysis as indicated by link operator 444. If no caption segments remain to be correlated, then the process 400 terminates and is considered complete for the particular group of caption segments as indicated by operation 446.

Figure 5:
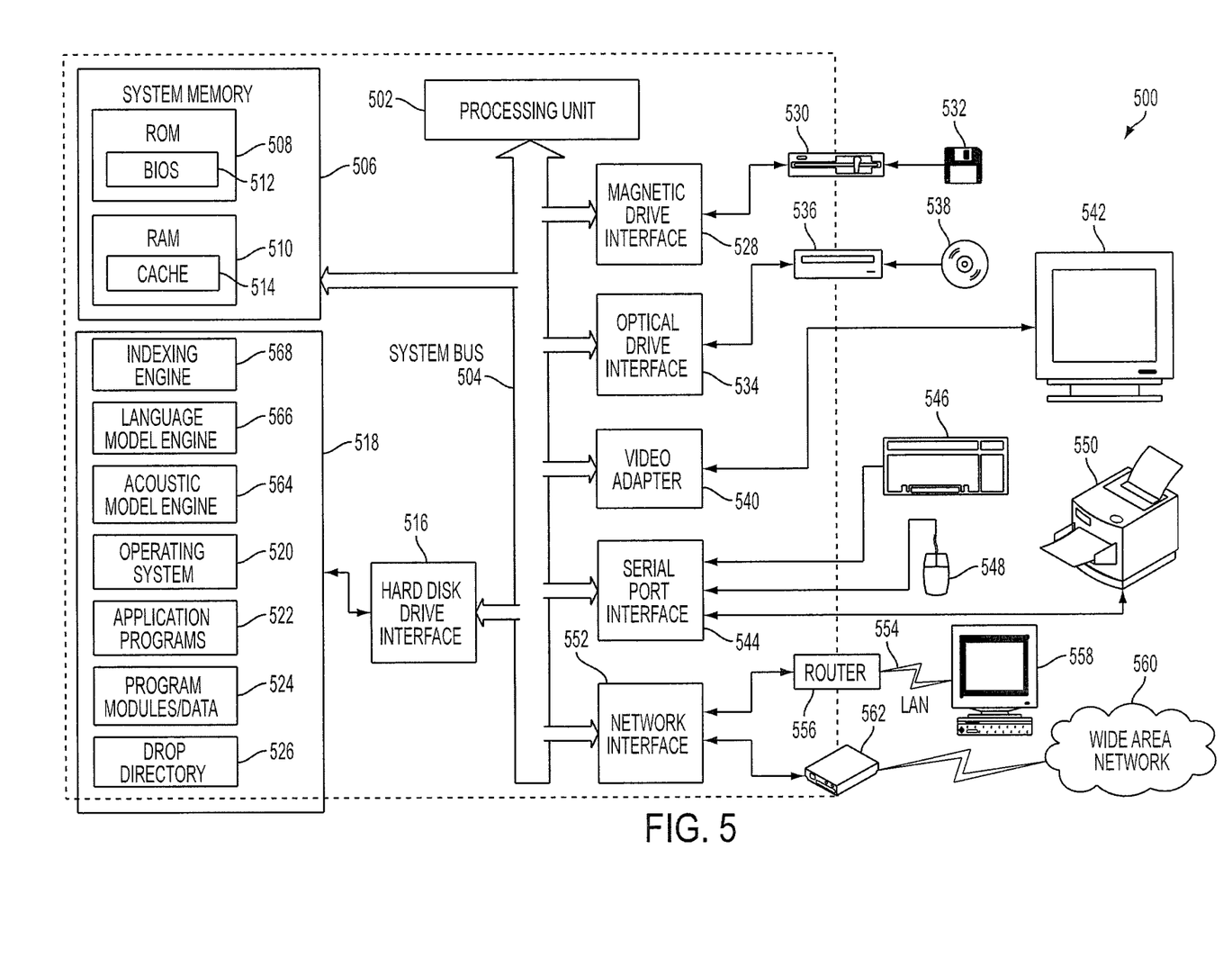
FIG. 5 is a schematic diagram of an example computer system that may be configured as one or more of the computer systems for performing the closed captioning synchronization and media search processes.

An example computer system 500 for implementing the closed-captioning synchronization processes above is depicted in FIG. 5. For example, a number of computer systems 500 for implementing each of the caption synchronization engines, the closed captioning system, the media service client, the audio/video encoder, the streaming media server, the caption server, and/or the web services clients may be one or more of a personal computer (PC), a workstation, a notebook or portable computer, a tablet PC, a handheld media player (e.g., an MP3 player), a smart phone device, a video gaming device, or a set top box, with internal processing and memory components as well as interface components for connection with external input, output, storage, network, and other types of peripheral devices. Internal components of the computer system in FIG. 5 are shown within the dashed line and external components are shown outside of the dashed line. Components that may be internal or external are shown straddling the dashed line. Alternatively to a PC, the computer system 500 may be in the form of any of a server, a mainframe computer, a distributed computer, an Internet appliance, or other computer devices, or combinations thereof.

In any embodiment or component of the system described herein, the computer system 500 includes a processor 502 and a system memory 506 connected by a system bus 504 that also operatively couples various system components. There may be one or more processors 502, e.g., a single central processing unit (CPU), or a plurality of processing units, commonly referred to as a parallel processing environment (for example, a dual-core, quad-core, or other multi-core processing device). The system bus 504 may be any of several types of bus structures including a memory bus or memory controller, a peripheral bus, a switched-fabric, point-to-point connection, and a local bus using any of a variety of bus architectures. The system memory 506 includes read only memory (ROM) 508 and random access memory (RAM) 510. A basic input/output system (BIOS) 512, containing the basic routines that help to transfer information between elements within the computer system 500, such as during start-up, is stored in ROM 508. A cache 514 may be set aside in RAM 510 to provide a high speed memory store for frequently accessed data.

A hard disk drive interface 516 may be connected with the system bus 504 to provide read and write access to a data storage device, e.g., a hard disk drive 518 or other computer readable medium, for nonvolatile storage of applications, files, and data. A number of program modules and other data may be stored on the hard disk 518, including an operating system 520, one or more application programs 522, and other program modules and related data files 524. In an example implementation, the hard disk drive 518 may store the media recording and closed-caption transcript in a drop directory 526, the acoustic model engine 564, the language model engine 566, and the indexing engine 568 for execution according to the example processes described herein above. Note that the hard disk drive 518 may be either an internal component or an external component of the computer system 500 as indicated by the hard disk drive 518 straddling the dashed line in FIG. 5. In some configurations, there may be both an internal and an external hard disk drive 518.

The computer system 500 may further include a magnetic disk drive 530 for reading from or writing to a removable magnetic disk 532, tape, or other magnetic media. The magnetic disk drive 530 may be connected with the system bus 504 via a magnetic drive interface 528 to provide read and write access to the magnetic disk drive 530 initiated by other components or applications within the computer system 500. The magnetic disk drive 530 and the associated computer-readable media may be used to provide nonvolatile storage of computer-readable instructions, data structures, program modules, and other data for the computer system 500.

The computer system 500 may additionally include an optical disk drive 536 for reading from or writing to a removable optical disk 538 such as a CD ROM or other optical media. The optical disk drive 536 may be connected with the system bus 504 via an optical drive interface 534 to provide read and write access to the optical disk drive 536 initiated by other components or applications within the computer system 500. The optical disk drive 530 and the associated computer-readable optical media may be used to provide nonvolatile storage of computer-readable instructions, data structures, program modules, and other data for the computer system 500.

A display device 542, e.g., a monitor, a television, or a projector, or other type of presentation device may also be connected to the system bus 504 via an interface, such as a video adapter 540 or video card. Similarly, audio devices, for example, external speakers or a microphone (not shown), may be connected to the system bus 504 through an audio card or other audio interface (not shown).

In addition to the monitor 542, the computer system 500 may include other peripheral input and output devices, which are often connected to the processor 502 and memory 506 through the serial port interface 544 that is coupled to the system bus 506. Input and output devices may also or alternately be connected with the system bus 504 by other interfaces, for example, a universal serial bus (USB), an IEEE 1394 interface ("Firewire"), a parallel port, or a game port. A user may enter commands and information into the computer system 500 through various input devices including, for example, a keyboard 546 and pointing device 548, for example, a mouse. Other input devices (not shown) may include, for example, a joystick, a game pad, a tablet, a touch screen device, a satellite dish, a scanner, a facsimile machine, a microphone, a digital camera, and a digital video camera.

Output devices may include a printer 550 and one or more loudspeakers 570 for presenting the audio performance of the sender. Other output devices (not shown) may include, for example, a plotter, a photocopier, a photo printer, a facsimile machine, and a press. In some implementations, several of these input and output devices may be combined into single devices, for example, a printer/scanner/fax/photocopier. It should also be appreciated that other types of computer-readable media and associated drives for storing data, for example, magnetic cassettes or flash memory drives, may be accessed by the computer system 500 via the serial port interface 544 (e.g., USB) or similar port interface.

The computer system 500 may operate in a networked environment using logical connections through a network interface 552 coupled with the system bus 504 to communicate with one or more remote devices. The logical connections depicted in FIG. 5 include a local-area network (LAN) 554 and a wide-area network (WAN) 560. Such networking environments are commonplace in home networks, office networks, enterprise-wide computer networks, and intranets. These logical connections may be achieved by a communication device coupled to or integral with the computer system 500. As depicted in FIG. 5, the LAN 554 may use a router 556 or hub, either wired or wireless, internal or external, to connect with remote devices, e.g., a remote computer 558, similarly connected on the LAN 554. The remote computer 558 may be another personal computer, a server, a client, a peer device, or other common network node, and typically includes many or all of the elements described above relative to the computer system 500.

To connect with a WAN 560, the computer system 500 typically includes a modem 562 for establishing communications over the WAN 560. Typically the WAN 560 may be the Internet. However, in some instances the WAN 560 may be a large private network spread among multiple locations, or a virtual private network (VPN). The modem 562 may be a telephone modem, a high speed modem (e.g., a digital subscriber line (DSL) modem), a cable modem, or similar type of communications device. The modem 562, which may be internal or external, is connected to the system bus 518 via the network interface 552. In alternate embodiments the modem 562 may be connected via the serial port interface 544. It should be appreciated that the network connections shown are merely examples and other means of and communications devices for establishing a network communications link between the computer system and other devices or networks may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein may be referred to variously as operations, steps, objects, engines, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the disclosure. One implementation of a computer program product provides a computer program storage medium readable by a computer system and encoding a computer program.

The above specification, examples and data provide a complete description of the structure and use of example embodiments of the disclosure. Although various embodiments of the disclosure have been described above with a certain degree of particularity, or with reference to one or more individual embodiments, those skilled in the art could make numerous alterations to the disclosed embodiments without departing from the spirit or scope of this disclosure. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the disclosure as defined in the following claims.

What is claimed is:

1. A method in a computer system for caption synchronization of media programs, comprising:
   receiving, utilizing at least one processing unit, at least a portion of a media stream and at least a portion of a caption data stream, the media stream and the caption data stream corresponding to an event, the media stream comprising at least an audio component;
   tuning, utilizing the least one processing unit, speech recognition functionality of an audio mining engine with the at least the portion of the caption data stream;
   converting, utilizing the at least one processing unit, at least a portion of the audio component to text by executing the speech recognition functionality of the tuned audio mining engine on the audio component;
   producing, utilizing the at least one processing unit, an audio mining transcript including timing information from the audio component and the text generated by the speech recognition functionality of the tuned audio mining engine;
   aligning, utilizing the at least one processing unit, the audio mining transcript with the at least the portion of the caption data stream; and
   generating a time synchronized caption data stream, utilizing the at least one processing unit, by applying the timing information from the audio mining transcript to the at least the portion of the caption stream based on the aligning.

2. The method of claim 1, further comprising:
   providing at least one search engine with access to the time synchronized caption data stream.

3. The method of claim 1, further comprising:
   the first output and the first input are combined as a first bi-directional port; and the second output comprises a second port different than the first port.

4. The method of claim 1, further comprising:
   searching the time synchronized caption data stream in response to a text search query; and
   providing access to a point in the at least the portion of the media stream that corresponds to a point in the time synchronized caption data stream at least partially matching the text search query.

5. The method of claim 4, wherein the caption data stream includes at least one metadata annotation and searching the time synchronized caption data stream comprises at least one of searching text of the time synchronized caption data stream and searching the at least one metadata annotation.

6. The method of claim 5, further comprising:
   indexing at least one of the text of the time synchronized caption data stream and the at least one metadata annotation.

7. The method of claim 4, further comprising:
   transmitting the point in the at least the portion of the media stream to a display device.

8. The method of claim 1, wherein said aligning, utilizing the at least one processing unit, the audio mining transcript with the at least the portion of the caption data stream comprises:
   dividing the at least the portion of the caption data stream into a plurality of discrete caption segments and the audio mining transcript into a plurality of overlapping transcript segments;
   comparing at least one of the plurality of discrete caption segments to at least one of the plurality of overlapping transcript segments; and
   associating the at least one of the plurality of discrete caption segments to the at least one of the plurality of overlapping transcript segments if the comparison indicates there is a strong correlation between the at least one of the plurality of discrete caption segments to the at least one of the plurality of overlapping transcript segments.

9. The method of claim 8, wherein said comparing at least one of the plurality of discrete caption segments to at least one of the plurality of overlapping transcript segments comprises:
   developing a language model of quasi-phonemes of the at least one of the plurality of discrete caption segments;
   building an acoustic model of the at least one of the plurality of overlapping transcript segments; and
   correlating the language model of quasi-phonemes of the at least one of the plurality of discrete caption segments with the acoustic model of the at least one of the plurality of overlapping transcript segments.

10. The method of claim 9, wherein the comparison indicates there is the strong correlation between the at least one of the plurality of discrete caption segments to the at least one of the plurality of overlapping transcript segments when there is a strong correlation between the language model of quasi-phonemes of the at least one of the plurality of discrete caption segments and the acoustic model of the at least one of the plurality of overlapping transcript segments.

11. A system for caption synchronization of media programs, comprising:
   at least one processing unit coupled to at least one storage media,
   at least one communication component, coupled to the at least one processing unit, operable to receive at least a portion of a media stream and at least a portion of a caption data stream, the media stream and the caption data stream corresponding to an event, the media stream comprising at least an audio component, and
   an audio mining engine, executable by the at least one processing unit, operable to produce an audio mining transcript including timing information wherein the at least one processing unit
      tunes speech recognition functionality of the audio mining engine utilizing the at least the portion of the caption data stream,
      converts at least a portion of the audio component to text by executing the speech recognition functionality of the tuned audio mining engine on the audio component,
      aligns the audio mining transcript with the at least the portion of the caption data stream, and
      generates a time synchronized caption data stream by applying the timing information to the at least the portion of the caption stream based on the aligning wherein the timing information is from the audio component and the text generated by the speech recognition functionality of the tuned audio mining engine.

12. The system of claim 11, wherein the at least one communication component transmits at least one of the at least the portion of the media stream and the time synchronized caption data stream substantially in real time with receiving the at least the portion of the media stream.

13. The system of claim 11, wherein the at least one processing unit provides at least one search engine with access to the time synchronized caption data stream via the at least one communication component.

14. The system of claim 11, wherein the processing unit is operable to search the time synchronized caption data stream in response to a text search query received by the at least one communication component and provide access to a point in the at least the portion of the media stream that corresponds to a point in the time synchronized caption data stream at least partially matching the text search query.

15. The system of claim 14, wherein the caption data stream includes at least one metadata annotation and the at least one processing unit searches the time synchronized caption data stream by searching at least one of text of the time synchronized caption data stream and the at least one metadata annotation.

16. The system of claim 15, wherein the at least one processing unit indexes at least one of the text of the time synchronized caption data stream and the at least one metadata annotation.

17. The system of claim 14, wherein the at least one processing unit transmits the point in the at least the portion of the media stream to a display device.

18. The system of claim 11, wherein the at least one processing unit aligns the audio mining transcript with the at least a portion of the caption data stream by:
   dividing the at least the portion of the caption data stream into a plurality of discrete caption segments and the audio mining transcript into a plurality of overlapping transcript segments;
   comparing at least one of the plurality of discrete caption segments to at least one of the plurality of overlapping transcript segments; and
   associating the at least one of the plurality of discrete caption segments to the at least one of the plurality of overlapping transcript segments if the comparison indicates there is a strong correlation between the at least one of the plurality of discrete caption segments to the at least one of the plurality of overlapping transcript segments.

19. The system of claim 18, wherein said comparing at least one of the plurality of discrete caption segments to at least one of the plurality of overlapping transcript segments comprises:
   developing a language model of quasi-phonemes of the at least one of the plurality of discrete caption segments;
   building an acoustic model of the at least one of the plurality of overlapping transcript segments; and
   correlating the language model of quasi-phonemes of the at least one of the plurality of discrete caption segments with the acoustic model of the at least one of the plurality of overlapping transcript segments.

20. The system of claim 19, wherein the comparison indicates there is the strong correlation between the at least one of the plurality of discrete caption segments to the at least one of the plurality of overlapping transcript segments when there is a strong correlation between the language model of quasi-phonemes of the at least one of the plurality of discrete caption segments and the acoustic model of the at least one of the plurality of overlapping transcript segments.

* * * * *